(12) United States Patent
Sakamoto

(10) Patent No.: US 11,694,671 B2
(45) Date of Patent: Jul. 4, 2023

(54) ACTIVE NOISE CONTROL DEVICE COMPARING PEAK FREQUENCIES IN IMPEDANCE FREQUENCY CHARACTERISTICS

(71) Applicant: HONDA MOTOR CO., LTD., Tokyo (JP)

(72) Inventor: Kosuke Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/578,547

(22) Filed: Jan. 19, 2022

(65) Prior Publication Data
US 2022/0230620 A1    Jul. 21, 2022

(30) Foreign Application Priority Data
Jan. 20, 2021 (JP) .................. 2021-007148

(51) Int. Cl.
*G10K 11/178* (2006.01)
*B60K 35/00* (2006.01)
*G10L 21/0232* (2013.01)

(52) U.S. Cl.
CPC ........ *G10K 11/17854* (2018.01); *B60K 35/00* (2013.01); *G10K 11/17823* (2018.01); *G10K 11/17825* (2018.01); *G10K 11/17833* (2018.01); *G10K 11/17881* (2018.01); *G10L 21/0232* (2013.01); *B60K 2370/178* (2019.05);
(Continued)

(58) Field of Classification Search
CPC ....... G10K 11/17854; G10K 11/17823; G10K 11/17825; G10K 11/17833; G10K 11/17881; G10K 2210/12; G10K 2210/12821; G10K 2210/3025; G10K 2210/3028; G10K 2210/30391;
(Continued)

(56) References Cited

U.S. PATENT DOCUMENTS 9,247,365 B1* 1/2016 Ellis .................. H04R 29/001
2013/0251164 A1* 9/2013 Gautama ............ H04R 3/007
381/59
(Continued)

FOREIGN PATENT DOCUMENTS

JP    H06-059688 A    3/1994
JP    6658869 B2     3/2020

*Primary Examiner* — Paul Kim
*Assistant Examiner* — Douglas J Suthers
(74) *Attorney, Agent, or Firm* — Carrier Shende & Associates, P.C.; Joseph P. Carrier; Jeffrey T. Gedeon

(57) ABSTRACT

An active noise control device includes a control signal generating unit including a first adaptive filter configured to generate a control signal by performing a filtering process on a reference signal corresponding to noise, an identifying unit configured to identify a peak frequency in an impedance frequency characteristic of an actuator, a peak frequency storage unit configured to store an initial peak frequency of the actuator, a first determination unit configured to determine whether or not a difference between the peak frequency currently identified and the initial peak frequency is greater than or equal to a threshold value, and a control unit configured to change a characteristic of the control signal generated by the control signal generating unit when the first determination unit determines that the difference is greater than or equal to the threshold value.

10 Claims, 10 Drawing Sheets

(52) U.S. Cl.
CPC ............... *G10K 2210/12* (2013.01); *G10K 2210/12821* (2013.01); *G10K 2210/3025* (2013.01); *G10K 2210/3028* (2013.01); *G10K 2210/30391* (2013.01); *G10K 2210/503* (2013.01)

(58) Field of Classification Search
CPC ............ G10K 2210/503; B60K 35/00; B60K 2370/178; G10L 21/0232
USPC ...................................................... 381/71.5
See application file for complete search history.

(56) References Cited

U.S. PATENT DOCUMENTS

2019/0028805 A1\* 1/2019 Goto .................... H04R 29/001
2021/0136491 A1\* 5/2021 Hodges ............... H04R 29/001

\* cited by examiner

ACTIVE NOISE CONTROL DEVICE COMPARING PEAK FREQUENCIES IN IMPEDANCE FREQUENCY CHARACTERISTICS

CROSS-REFERENCE TO RELATED APPLICATIONS

This application is based upon and claims the benefit of priority from Japanese Patent Application No. 2021-007148 filed on Jan. 20, 2021, the contents of which are incorporated herein by reference.

BACKGROUND OF THE INVENTION

Field of the Invention

The present invention relates to an active noise control device and a vehicle.

Description of the Related Art

JP H06-059688 A discloses an active noise canceling device. The active noise canceling device disclosed in JP H06-059688 A includes a sound generating device, a sound detection sensor, and a vibration sensor. The sound generating device is disposed in a space where noise is to be canceled. The sound detection sensor is disposed in the space where noise is to be canceled. The vibration sensor is provided for each of a plurality of vibration sources of several vibrations propagating in the space where noise is to be canceled. The active noise canceling device disclosed in JP H06-059688 A further includes a vibration signal generating means and a driving means. The vibration signal generating means generates a vibration signal having an opposite phase to the sound detected by the sound detection sensor, based on the output signals of the plurality of vibration sensors. The driving means drives the sound generating device based on the vibration signal.

SUMMARY OF THE INVENTION

However, in JP H06-059688 A, noise cannot always be reduced suitably when a change occurs in the characteristics of the sound generating device.

An object of the present invention is to provide an active noise control device and a vehicle that can reduce noise suitably.

An active noise control device according to an aspect of the present invention causes an actuator to output a canceling sound based on a control signal in order to reduce noise in a vehicle compartment of a vehicle. The active noise control device includes a control signal generating unit including a first adaptive filter configured to generate the control signal by performing a filtering process on a reference signal corresponding to the noise, an identifying unit configured to identify a peak frequency in an impedance frequency characteristic that is a frequency characteristic of impedance of the actuator, a peak frequency storage unit configured to store an initial peak frequency that is the peak frequency in the impedance frequency characteristic in an initial state, a first determination unit configured to determine whether or not a difference between the peak frequency currently identified by the identifying unit and the initial peak frequency stored in the peak frequency storage unit is greater than or equal to a threshold value, and a control unit configured to change a characteristic of the control signal generated by the control signal generating unit when the first determination unit determines that the difference is greater than or equal to the threshold value.

A vehicle according to another aspect of the present invention includes the active noise control device as described above.

According to the present invention, it is possible to provide an active noise control device and a vehicle which can reduce noise suitably.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Preferred embodiments of an active noise control device and a vehicle according to the present invention will be described in detail below with reference to the accompanying drawings.

Embodiment

Figure 1:
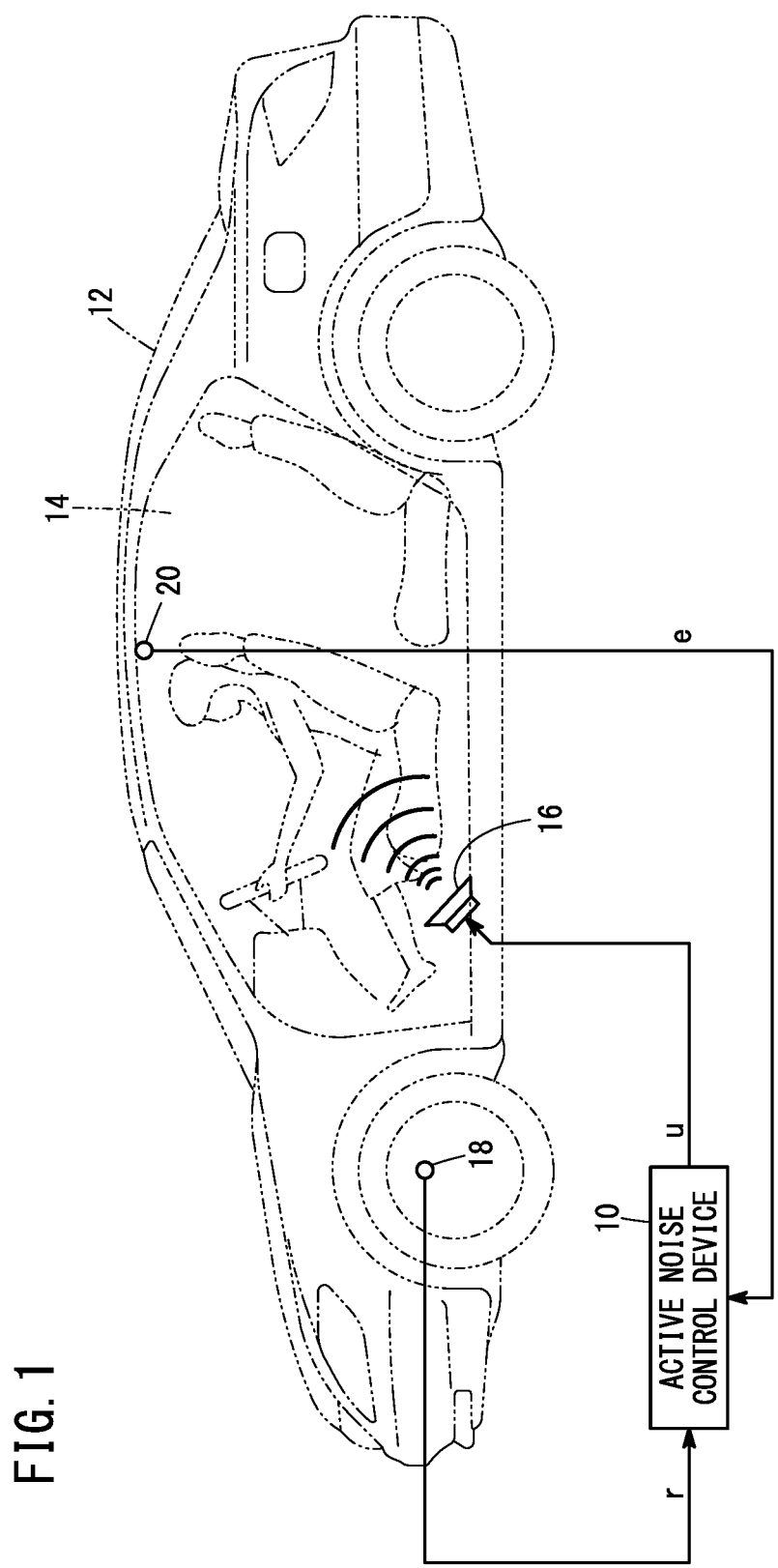
FIG. 1 is a diagram illustrating an outline of active noise control.

An active noise control device and a vehicle according to an embodiment will be described with reference to FIGS. 1 to 10. FIG. 1 is a diagram illustrating an outline of active noise control.

An active noise control device 10 causes an actuator 16 to output a canceling sound for reducing noise (vibration noise) in a vehicle compartment 14 of a vehicle 12.

The noise in the vehicle compartment 14 may include, for example, road noise. Road noise is noise that is transmitted to an occupant in the vehicle compartment 14 when a wheel vibrates due to force received from the road surface and the vibration of the wheel is transmitted to the vehicle body via a suspension.

The vehicle 12 is provided with a vibration sensor that detects vibration of the vehicle 12. That is, the vehicle 12 is provided with an acceleration sensor 18 that detects vibration of the vehicle 12. The signal r detected by the acceleration sensor 18 is supplied to the active noise control device 10 as a reference signal r. That is, the signal r indicating vibration is supplied to the active noise control device 10 as the reference signal r. Although the case where the signal detected by the acceleration sensor 18 is used as the reference signal r is illustrated in FIG. 1, the present invention is not limited thereto. A signal correlated with the vibration of the vehicle 12 can be appropriately used as the reference signal r. That is, a signal corresponding to the noise can be appropriately used as the reference signal r.

A microphone 20 is further provided in the vehicle compartment 14. The microphone 20 detects residual noise (cancellation error noise) due to interference between the noise and the canceling sound output from the actuator 16. The residual noise detected by the microphone 20 is supplied to the active noise control device 10. That is, an error signal e detected by the microphone 20 is supplied to the active noise control device 10.

The active noise control device 10 generates a control signal u for outputting a canceling sound from the actuator 16, based on an error signal e detected by the microphone 20 and the reference signal r. More specifically, the active noise control device 10 generates the control signal u such that the error signal e detected by the microphone 20 is minimized. Since the actuator 16 outputs the canceling sound based on the control signal u that minimizes the error signal e detected by the microphone 20, the noise in the vehicle compartment 14 can be suitably canceled out by the canceling sound. In this way, the active noise control device 10 can reduce noise transmitted to an occupant in the vehicle compartment 14.

Incidentally, when the characteristic of the actuator 16 has changed over time or the like, the noise in the vehicle compartment 14 cannot always be cancelled out suitably. As a result of intensive studies, the inventors of the present application have conceived the active noise control device 10 as described below.

Figure 2:
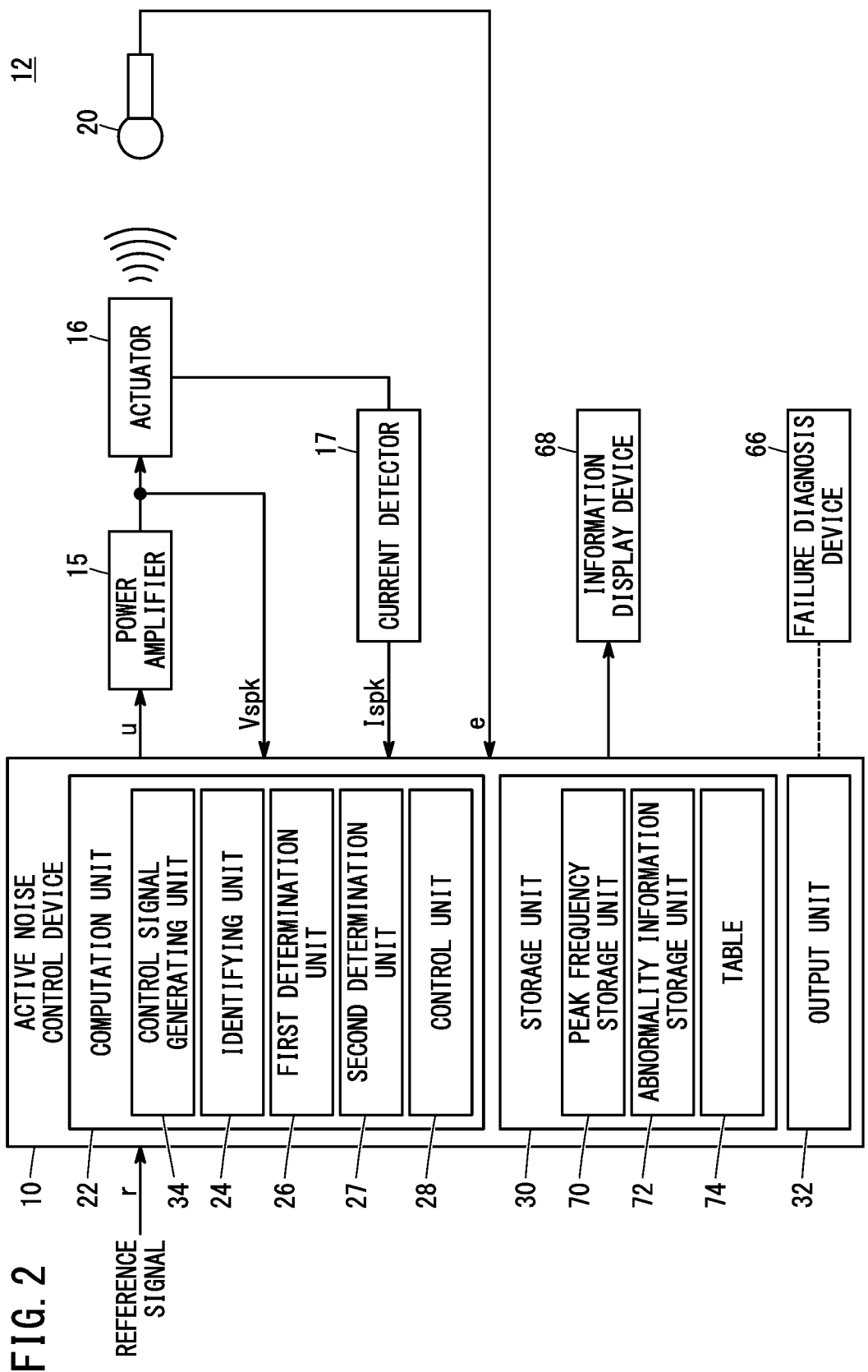
FIG. 2 is a block diagram illustrating a part of a vehicle equipped with an active noise control device according to an embodiment.

FIG. 2 is a block diagram illustrating a part of a vehicle equipped with the active noise control device according to the present embodiment.

As shown in FIG. 2, the active noise control device 10 includes a computation unit 22, a storage unit 30, and an output unit 32.

The computation unit 22 may be configured by a processor such as a CPU (Central Processing Unit), a DSP (Digital Signal Processor), or the like. However, the present invention is not limited to this feature. A DDS (Direct Digital Synthesizer), a DCO (Digitally Controlled Oscillator), or the like can be included in the computation unit 22. In addition, an ASIC (Application Specific Integrated Circuit), an FPGA (Field-Programmable Gate Array), or the like can be included in the computation unit 22.

The storage unit 30 may be configured by a volatile memory (not illustrated) and a nonvolatile memory (not illustrated). Examples of the volatile memory include, for example, a RAM or the like. Examples of the nonvolatile memory include, for example, a ROM, a flash memory, or the like. Data or the like may be stored, for example, in the volatile memory. Programs, tables, maps, and the like may be stored, for example, in the nonvolatile memory. The storage unit 30 may include a peak frequency storage unit 70, an abnormality information storage unit 72, and a table 74.

The output unit 32 may be configured by an output interface circuit or the like.

The computation unit 22 includes a control signal generating unit 34, an identifying unit 24, a first determination unit 26, a second determination unit 27, and a control unit 28. The control signal generating unit 34, the identifying unit 24, the first determination unit 26, the second determination unit 27, and the control unit 28 can be realized by the computation unit 22 executing a program stored in the storage unit 30.

The active noise control device 10 may be supplied with the reference signal r. The reference signal r can be supplied from, for example, the acceleration sensor 18 (see FIG. 1), but is not limited thereto. As described above, a signal correlated with the vibration of the vehicle 12 can be appropriately used as the reference signal r. That is, a signal corresponding to the noise can be appropriately used as the reference signal r.

As described above, the microphone 20 that detects the residual noise due to interference between the noise and the canceling sound is provided in the vehicle compartment 14 (see FIG. 1). That is, the microphone 20 for detecting the error signal e is provided in the vehicle compartment 14.

As described above, the vehicle compartment 14 (see FIG. 1) is provided with the actuator 16 that outputs a canceling sound based on the control signal u. As examples of the actuator 16, there may be cited a speaker.

Figure 3:
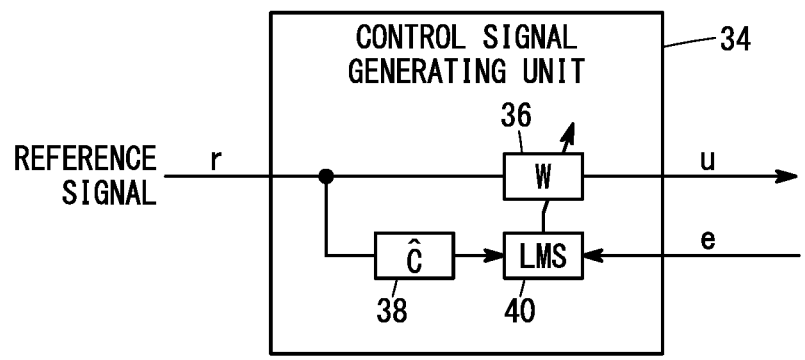
FIG. 3 is a block diagram illustrating an example of a control signal generating unit.

FIG. 3 is a block diagram illustrating an example of a control signal generating unit.

The control signal generating unit (filter unit) 34 includes an adaptive filter 36, an acoustic characteristic filter 38, and a filter coefficient updating unit 40.

The adaptive filter (first adaptive filter) 36 generates a control signal u by performing a filtering process on the reference signal r. As the adaptive filter 36, for example, an FIR (Finite Impulse Response) filter or the like can be used, but the present invention is not limited to this feature. The filter coefficient W of the adaptive filter 36 is updated by the filter coefficient updating unit 40 as described later. The FIR filter generates the control signal u by performing a convolution operation on the reference signal r.

The acoustic characteristic filter 38 corrects the reference signal r by performing a filtering process on the reference signal r according to an acoustic characteristic (transfer characteristic) from the actuator 16 to the microphone 20. The acoustic characteristic from the actuator 16 to the microphone 20, that is, a transfer characteristic $\hat{C}$, is obtained in advance.

The filter coefficient updating unit 40 updates the filter coefficient W of the adaptive filter 36 based on the error signal e acquired by detecting the residual noise by the microphone 20 and the reference signal r corrected by the acoustic characteristic filter 38. More specifically, the filter coefficient updating unit 40 updates the filter coefficient W of the adaptive filter 36 such that the error signal e acquired by detecting the residual noise by the microphone 20 is minimized. When the filter coefficient W is updated, for example, a filtered-X LMS algorithm can be used, but the present invention is not limited to this feature.

In this manner, the adaptive filter 36 generates a control signal u by performing a filtering process on the reference signal r corresponding to the noise. As shown in FIG. 2, the control signal u generated by the control signal generating unit 34 is supplied to the actuator 16 via a power amplifier 15.

The identifying unit 24 identifies a peak frequency (resonance frequency) f0 in an impedance frequency characteristic that is a frequency characteristic of the impedance of the actuator 16.

Figure 4:
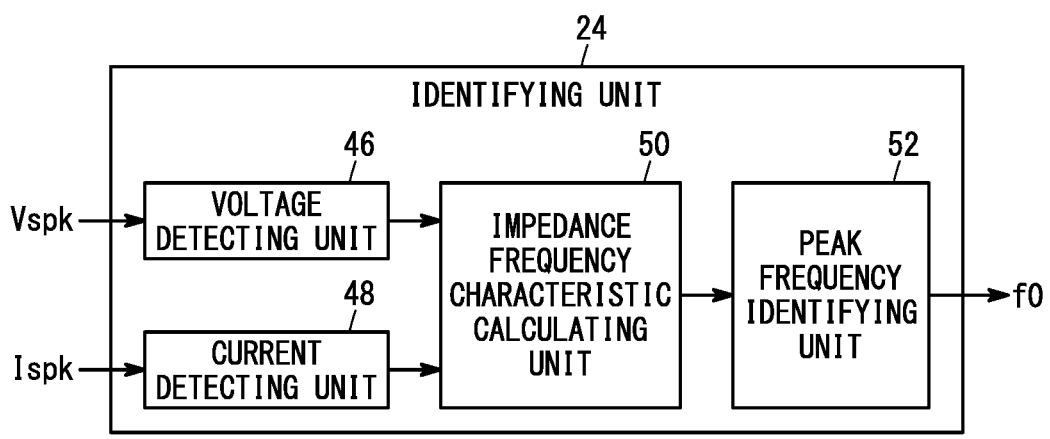
FIG. 4 is a block diagram illustrating an example of an identifying unit.

FIG. 4 is a block diagram illustrating an example of an identifying unit.

The identifying unit 24 shown in FIG. 4 includes a voltage detecting unit 46, a current detecting unit 48, an impedance frequency characteristic calculating unit 50, and a peak frequency identifying unit 52.

The voltage detecting unit 46 detects a voltage signal Vspk which is a time waveform signal of a voltage applied to the actuator 16. As shown in FIG. 2, the time waveform signal of the voltage supplied from the power amplifier 15 to the actuator 16 is also supplied to the active noise control device 10. That is, the voltage signal Vspk is also supplied to the active noise control device 10. The voltage detecting unit 46 detects the voltage signal Vspk thus supplied.

The current detecting unit 48 detects a current signal Ispk which is a time waveform signal of a current consumed in the actuator 16. As shown in FIG. 2, a current detector 17 that detects a current consumed by the actuator 16 is connected to the actuator 16. The current detector 17 detects a current consumed in the actuator 16 and supplies a current signal Ispk, which is a time waveform signal of the current, to the active noise control device 10. The current detecting unit 48 detects the current signal Ispk supplied from the current detector 17.

The impedance frequency characteristic calculating unit 50 calculates an impedance frequency characteristic of the actuator 16 based on the voltage signal Vspk and the current signal Ispk. More specifically, the impedance frequency characteristic calculating unit 50 calculates the impedance frequency characteristic of the actuator 16 by performing Fourier transform.

Figure 5:
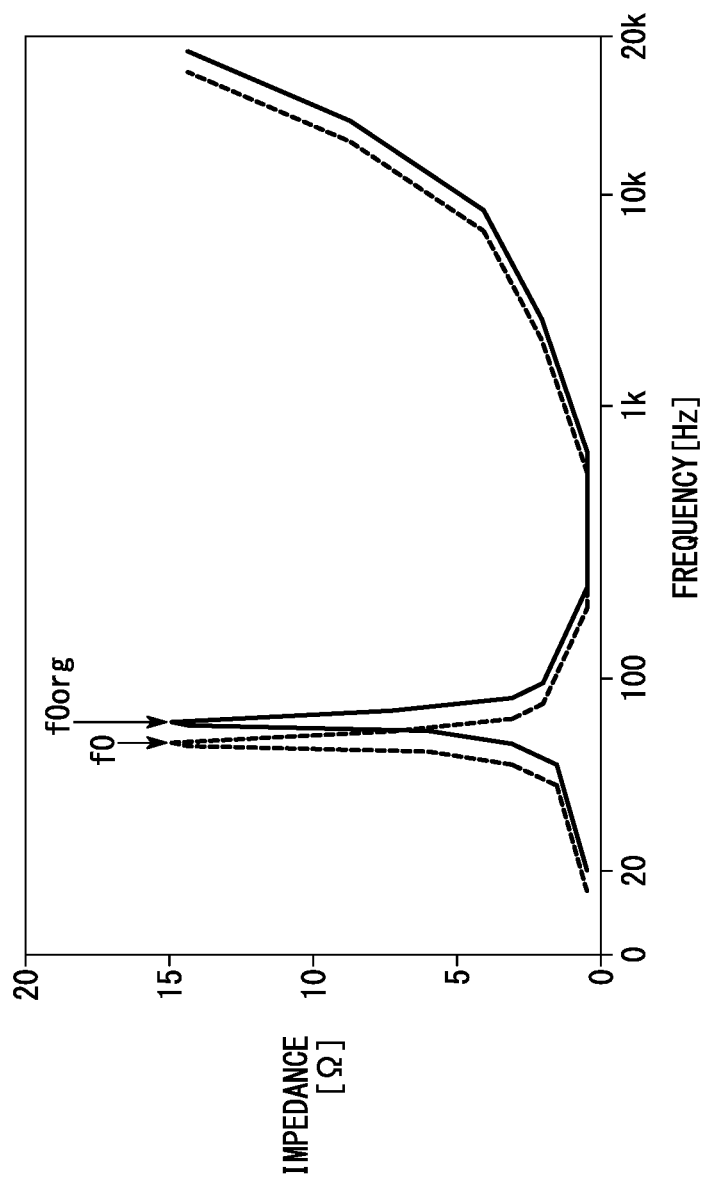
FIG. 5 is a graph illustrating examples of impedance frequency characteristics of an actuator.

FIG. 5 is a graph illustrating examples of impedance frequency characteristics of an actuator. The horizontal axis in FIG. 5 indicates frequency. The vertical axis in FIG. 5 indicates the impedance of the actuator 16. The solid line in FIG. 5 shows an example of the impedance frequency characteristic of the actuator 16 in the initial state. The dotted line in FIG. 5 shows an example of the impedance frequency characteristic of the actuator 16 after the actuator 16 has changed over time.

The peak frequency identifying unit 52 identifies a peak frequency f0 by performing frequency analysis on the impedance frequency characteristic calculated by the impedance frequency characteristic calculating unit 50. That is, the peak frequency identifying unit 52 scans the impedance frequency characteristic calculated by the impedance frequency characteristic calculating unit 50, and identifies the frequency at which the impedance of the actuator 16 is maximized as the peak frequency f0. Thus, the peak frequency f0 in the impedance frequency characteristic of the actuator 16 is identified.

Figure 6:
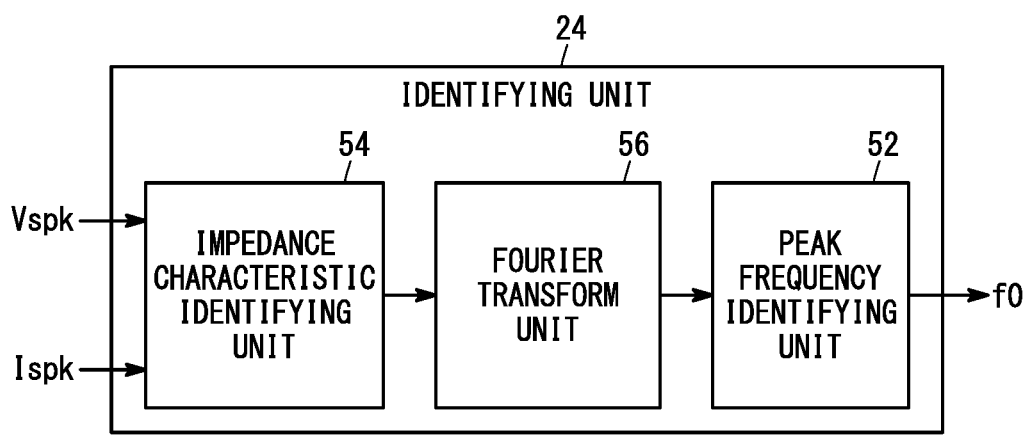
FIG. 6 is a block diagram illustrating another example of the identifying unit.

FIG. 6 is a block diagram illustrating another example of the identifying unit.

The identifying unit 24 shown in FIG. 6 includes an impedance characteristic identifying unit 54, a Fourier transform unit 56, and the peak frequency identifying unit 52.

The impedance characteristic identifying unit 54 identifies an impedance characteristic of the actuator 16.

Figure 7:
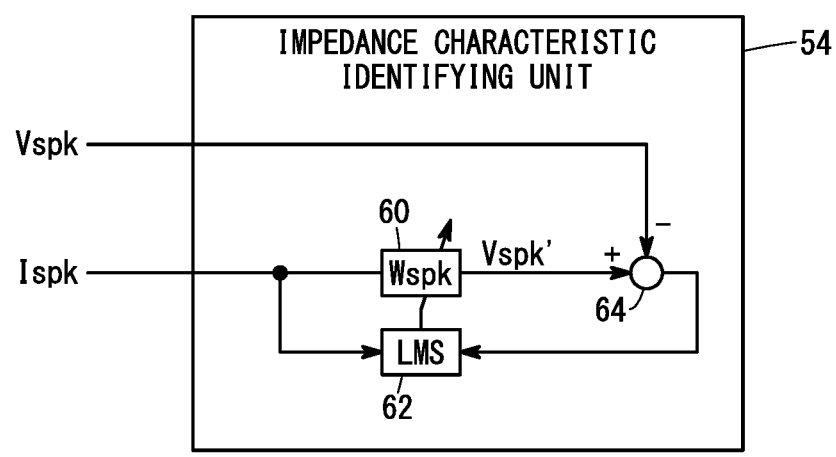
FIG. 7 is a block diagram illustrating an example of an impedance characteristic identifying unit.

FIG. 7 is a block diagram illustrating an example of an impedance characteristic identifying unit.

The impedance characteristic identifying unit 54 includes an adaptive filter 60, a filter coefficient updating unit 62, and a calculator 64.

The adaptive filter (second adaptive filter) 60 outputs a simulated voltage signal Vspk' by performing a filtering process on a current signal Ispk that is a time waveform signal of a current consumed in the actuator 16. The filter coefficient Wspk of the adaptive filter 60 is different from the filter coefficient W of the adaptive filter 36. Therefore, the filtering process performed by the adaptive filter 60 is different from the filtering process performed by the adaptive filter 36 described above.

The calculator 64 calculates a difference between the voltage signal Vspk, which is a time waveform signal of the voltage applied to the actuator 16, and the simulated voltage signal Vspk'. The calculation result of the calculator 64 is supplied to the filter coefficient updating unit 62.

The filter coefficient updating unit 62 updates the filter coefficients Wspk of the adaptive filter 60 so as to minimize the difference between the simulated voltage signal Vspk' and the voltage signal Vspk, which is a time waveform signal of the voltage applied to the actuator 16.

Thus, the filter coefficient Wspk of the adaptive filter 60 becomes a value corresponding to the impedance characteristic of the actuator 16. That is, the impedance characteristic of the actuator 16 is identified by the impedance characteristic identifying unit 54.

The Fourier transform unit 56 performs the Fourier transform on the adaptive filter 60 to obtain an impedance frequency characteristic of the actuator 16. That is, the Fourier transform unit 56 obtains the impedance frequency characteristic of the actuator 16 by performing the Fourier transform on the adaptive filter 60 having the filter coefficient Wspk corresponding to the impedance characteristic of the actuator 16.

The peak frequency identifying unit 52 identifies the peak frequency f0 by frequency analyzing the impedance frequency characteristic obtained by the Fourier transform unit 56. That is, the peak frequency identifying unit 52 scans the impedance frequency characteristic calculated by the Fourier transform unit 56, and identifies a frequency at which the impedance of the actuator 16 is maximized as the peak frequency f0. Thus, the peak frequency f0 in the impedance frequency characteristic of the actuator 16 is identified. As described above, the peak frequency f0 in the impedance frequency characteristic may be obtained using the adaptive filter 60.

An initial peak frequency f0org, which is a peak frequency in the impedance frequency characteristic in an initial period, is stored in advance in the peak frequency storage unit 70. The initial period is a period before the actuator 16 is changed over time. Specifically, the initial period may be, for example, a period when the active noise control device 10 was installed on the vehicle 12, but is not limited thereto. The initial peak frequency f0org may be measured, for example, when the active noise control device 10 was installed on the vehicle 12, but is not limited thereto.

The first determination unit 26 determines whether or not the difference between the peak frequency f0 currently identified by the identifying unit 24 and the initial peak frequency f0org stored in the peak frequency storage unit 70 is greater than or equal to a threshold value TH.

The control unit 28 performs the following control, when the first determination unit 26 determines that the difference between the peak frequency f0 currently identified by the identifying unit 24 and the initial peak frequency f0org stored in the peak frequency storage unit 70 is greater than or equal to the threshold value TH. That is, in such a case, the characteristic of the control signal u generated by the control signal generating unit 34 is changed.

The characteristic of the control signal u can be performed by switching the acoustic characteristic $\hat{C}$ applied to the acoustic characteristic filter 38, but is not limited thereto.

Figure 8:
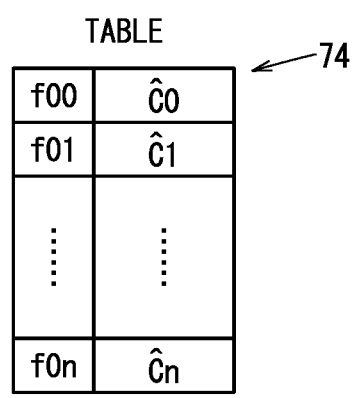
FIG. 8 is a diagram illustrating an example of a table.

FIG. 8 is a diagram illustrating an example of a table. As shown in FIG. 8, the table 74 stores a plurality of acoustic characteristics $\hat{C}$ corresponding to the respective peak frequencies f0. The reference character Ĉ0 denotes an acoustic characteristic when the peak frequency is f00. The reference character Ĉ1 denotes an acoustic characteristic when the peak frequency is f01. The reference character Ĉn denotes an acoustic characteristic when the peak frequency is f0n. The reference character f0 is used when describing a peak frequency in general, and the reference signs f00 to f0n are used when describing individual peak frequencies. The reference character Ĉ is used when describing an acoustic characteristic in general. The reference characters Ĉ0 to Ĉn are used when describing individual acoustic characteristics.

The control unit 28 can change the characteristic of the control signal u generated by the control signal generating unit 34, by appropriately switching according to the peak frequency f0 the acoustic characteristics Ĉ applied by the acoustic characteristic filter 38. That is, the control unit 28 reads out the acoustic characteristic Ĉ corresponding to the current peak frequency f0 from the table 74, and applies the acoustic characteristic Ĉ read out from the table 74 to the acoustic characteristic filter 38. In this way, the characteristic of the control signal u generated by the control signal generating unit 34 is changed.

The second determination unit 27 can determine whether or not the peak frequency f0 is within a predetermined range of frequency.

When the second determination unit 27 determines that the peak frequency f0 is not within the predetermined range of frequency, the control unit 28 causes the control signal generating unit 34 to stop generating the control signals u. That is, when the peak frequency f0 changes significantly, the control unit 28 stops the generation of the control signal u by the control signal generating unit 34.

When the second determination unit 27 determines that the peak frequency f0 is not within the predetermined range of frequency, the control unit 28 stores in the abnormality information storage unit 72, information indicating that an abnormality has occurred in the characteristic of the actuator 16.

When the second determination unit 27 determines that the peak frequency f0 is not within the predetermined range of frequency, the control unit 28 causes an information display device 68 provided in the vehicle 12 to display information indicating that the abnormality has occurred in the characteristic of the actuator 16.

The output unit 32 notifies a failure diagnosis device 66 of information indicating that the abnormality has occurred in the characteristic of the actuator 16. When the failure diagnosis device 66 is connected to the vehicle 12, the control unit 28 notifies the failure diagnosis device 66 of information indicating that the abnormality has occurred in the characteristic of the actuator 16 via the output unit 32.

Figure 9:
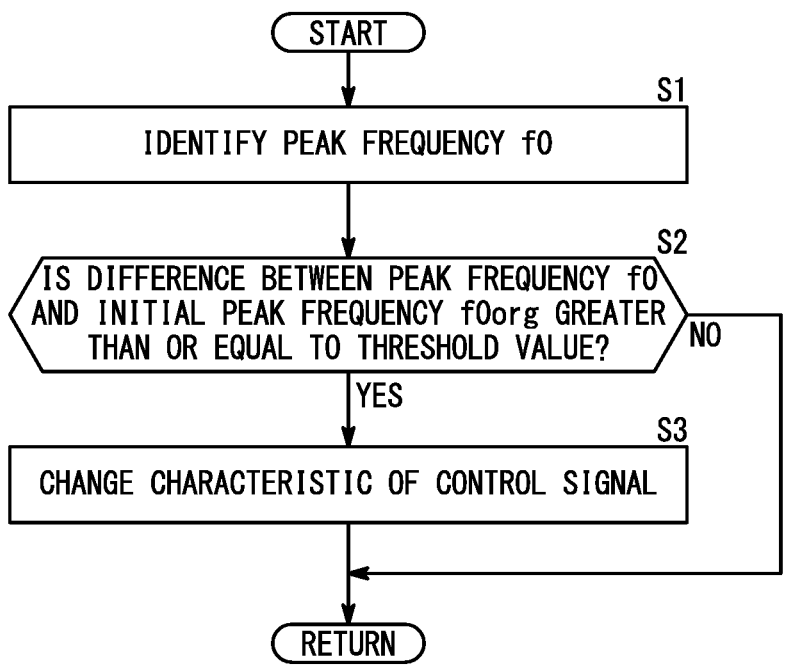
FIG. 9 is a flowchart illustrating an example of operations of an active noise control device according to an embodiment.

FIG. 9 is a flowchart illustrating an example of operations of the active noise control device according to the present embodiment.

In step S1, the identifying unit 24 identifies the peak frequency f0 in the impedance frequency characteristic of the actuator 16. Thereafter, the process transitions to step S2.

In step S2, the first determination unit 26 determines whether or not the difference between the peak frequency f0 currently identified by the identifying unit 24 and the initial peak frequency f0org stored in the peak frequency storage unit 70 is greater than or equal to the threshold value TH. When the difference is greater than or equal to the threshold value TH (YES in step S2), the process proceeds to step S3. When the difference is less than the threshold value TH (NO in step S2), the process shown in FIG. 9 is completed.

In step S3, the control unit 28 changes the characteristic of the control signal u. As described above, the characteristic of the control signal u can be changed by switching the acoustic characteristics Ĉ applied to the acoustic characteristic filter 38, but is not limited to this. Upon carrying out these steps, the process shown in FIG. 9 is brought to an end.

Figure 10:
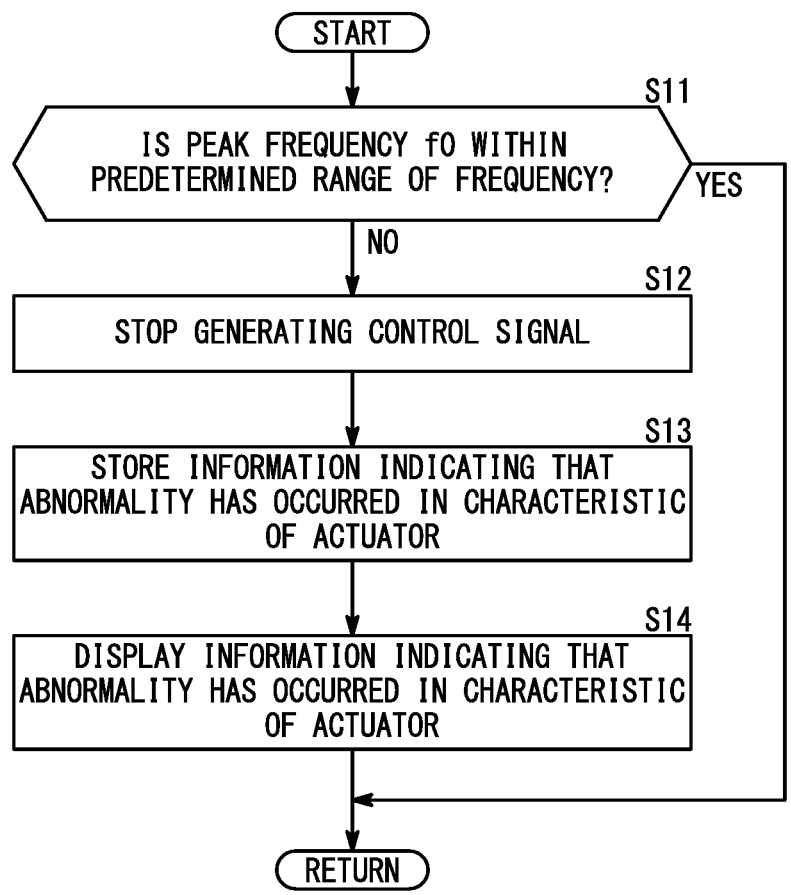
FIG. 10 is a flowchart illustrating an example of operations of an active noise control device according to an embodiment.

FIG. 10 is a flowchart illustrating an example of operations of the active noise control device according to the present embodiment.

In step S11, the second determination unit 27 determines whether or not the peak frequency f0 is within a predetermined range of frequency. When the peak frequency f0 is not within the predetermined range of frequency (NO in step S11), the process transitions to step S12. If the peak frequency f0 is within the predetermined range of frequency (YES in step S11), the process shown in FIG. 10 is completed.

In step S12, the control unit 28 stops generating the control signal u by the control signal generating unit 34. Thereafter, the process proceeds to step S13.

In step S13, the control unit 28 stores information indicating that an abnormality has occurred in the characteristic of the actuator 16 in the abnormality information storage unit 72. Thereafter, the process transitions to step S14.

In step S14, the control unit 28 causes the information display device 68 provided in the vehicle 12 to display information indicating that the abnormality has occurred in the characteristic of the actuator 16. Upon carrying out these steps, the process shown in FIG. 10 is brought to an end.

As described above, in the present embodiment, it is determined whether or not the difference between the peak frequency f0 currently identified by the identifying unit 24 and the initial peak frequency f0org stored in the peak frequency storage unit 70 is greater than or equal to a threshold value TH. When it is determined that the difference is greater than or equal to the threshold value TH, the characteristic of the control signal u generated by the control signal generating unit 34 is changed. Consequently, according to the present embodiment, it is possible to provide the active noise control device 10 that is capable of suitably canceling noise in the vehicle compartment 14 even when a change occurs in the characteristic of the actuator 16 due to a change over time or the like, and thus capable of suitably reducing noise.

Although preferred embodiments of the present invention have been described above, the present invention is not limited to the above-described embodiments, and various modifications can be made thereto without departing from the essence and gist of the present invention.

The above-described embodiments can be summarized in the following manner.

The active noise control device (10) causes the actuator (16) to output the canceling sound based on the control signal (u) in order to reduce noise in the vehicle compartment (14) of the vehicle (12), and includes the control signal generating unit (34) including the first adaptive filter (36) configured to generate the control signal by performing a filtering process on the reference signal (r) corresponding to the noise, the identifying unit (24) configured to identify the peak frequency (f0) in an impedance frequency characteristic that is a frequency characteristic of impedance of the actuator, the peak frequency storage unit (70) configured to store the initial peak frequency (f0org) that is the peak frequency in the impedance frequency characteristic in an initial state, the first determination unit (26) configured to determine whether or not a difference between the peak frequency currently identified by the identifying unit and the initial peak frequency stored in the peak frequency storage unit is greater than or equal to the threshold value (TH), and the control unit (28) configured to change a characteristic of the control signal generated by the control signal generating unit when the first determination unit determines that the difference is greater than or equal to the threshold value. According to such a configuration, when the difference becomes equal to or greater than the threshold value due to a change over time or the like, the characteristic of the control signal generated by the control signal generating unit is changed. Consequently, according to such a configuration, it is possible to provide an active noise control device that is capable of suitably canceling noise in the vehicle compartment even in a case where a change occurs in the characteristic of the actuator due to a change over time or the like, and thus capable of suitably reducing noise.

The identifying unit may include the voltage detecting unit (46) configured to detect a voltage signal (Vspk) that is a time waveform signal of a voltage applied to the actuator, the current detecting unit (48) configured to detect the current signal (Ispk) that is a time waveform signal of a current consumed by the actuator, the impedance frequency characteristic calculating unit (50) configured to calculate the impedance frequency characteristic based on the voltage signal and the current signal, and the peak frequency identifying unit (52) configured to identify the peak frequency by performing frequency analysis on the impedance frequency characteristic. According to such a configuration, the peak frequency can be identified based on the impedance frequency characteristic.

The identifying unit may include the impedance characteristic identifying unit (54) configured to calculate an impedance characteristic of the actuator, wherein the impedance characteristic identifying unit includes the second adaptive filter (60) configured to output the simulated voltage signal (Vspk') by performing a filtering process that is different from the filtering process performed by the first adaptive filter, on a current signal that is a time waveform signal of a current consumed by the actuator, and the second filter coefficient updating unit (62) configured to update the filter coefficient (Wspk) of the second adaptive filter so as to minimize a difference between the simulated voltage signal and a voltage signal that is a time waveform signal of a voltage applied to the actuator, and the identifying unit further includes the Fourier transform unit (56) configured to perform a Fourier transform on the second adaptive filter to obtain the impedance frequency characteristic, and a peak frequency identifying unit configured to perform frequency analysis on the impedance frequency characteristic obtained by the Fourier transform unit to identify the peak frequency.

The active noise control device may further include the second determination unit (27) configured to determine whether or not the peak frequency is within a predetermined frequency range, wherein, when the second determination unit determines that the peak frequency is not within the frequency range, the control unit is configured to cause the control signal generating unit to stop generating the control signal. According to such a configuration, since the generation of the control signal is stopped when the peak frequency in the impedance frequency characteristic of the actuator significantly changes, it is possible to prevent an increase in noise or the like caused by a failure, an abnormality, or the like of the actuator.

The active noise control device may further include the second determination unit configured to determine whether or not the peak frequency is within a predetermined frequency range, and the abnormality information storage unit (72) configured to store information indicating that an abnormality has occurred in a characteristic of the actuator when the second determination unit determines that the peak frequency is not within the frequency range. According to such a configuration, information indicating that an abnormality has occurred in the actuator can be used for failure diagnosis or the like.

When the second determination unit determines that the peak frequency is not within the frequency range, the control unit (28) may be configured to cause the information display device (68) provided at the vehicle to display information indicating that the abnormality has occurred in the characteristic of the actuator. According to this configuration, since the information indicating that an abnormality has occurred in the characteristic of the actuator can be displayed on the information display device, the user can notice that an abnormality has occurred in the characteristic of the actuator based on the display of the information display device.

The active noise control device may further include the output unit (32) configured to notify the failure diagnosis device (66) of information indicating that the abnormality has occurred in the characteristic of the actuator. According to this configuration, since the information indicating that an abnormality has occurred in the characteristic of the actuator can be supplied to the failure diagnosis device, an accurate failure diagnosis can be performed by the failure diagnosis device.

The active noise control device may further include the table (74) containing the plurality of acoustic characteristics (Ĉ) corresponding to the respective peak frequencies, the acoustic characteristic filter (38) configured to correct the reference signal by performing a filtering process on the reference signal in accordance with any of the acoustic characteristics contained in the table, and the first filter coefficient updating unit (40) configured to update the filter coefficient (W) of the first adaptive filter, based on the error signal (e) acquired by detecting residual noise due to interference between the noise and the canceling sound by the microphone (20) and the reference signal corrected by the acoustic characteristic filter, wherein the control unit may be configured to change the characteristic of the control signal generated by the control signal generating unit, by switching the acoustic characteristics applied to the acoustic characteristic filter according to the peak frequencies. According to such a configuration, since the acoustic characteristic in the acoustic characteristic filter is switched in accordance with the peak frequency, the characteristic of the control signal can be accurately changed without requiring complicated signal processing. That is, according to such a configuration, it is possible to prevent the control of the vibration of the noise from becoming unstable, and it is possible to suitably reduce the noise.

The actuator may be a speaker.

The vehicle includes an active noise control device as described above.

What is claimed is:

1. An active noise control device that causes an actuator to output a canceling sound based on a control signal in order to reduce noise in a vehicle compartment of a vehicle, the active noise control device comprising one or more processors that execute computer-executable instructions stored in a memory, wherein the one or more processors execute the computer-executable instructions to cause the active noise control device to:

generate the control signal by performing a filtering process on a reference signal corresponding to the noise, by a first adaptive filter;

identify a peak frequency in an impedance frequency characteristic that is a frequency characteristic of impedance of the actuator;

store an initial peak frequency that is the peak frequency in the impedance frequency characteristic in an initial state;

determine whether or not a difference between the currently identified peak frequency and the stored initial peak frequency is greater than or equal to a threshold value; and change a characteristic of the generated control signal when it is determined that the difference is greater than or equal to the threshold value.

2. The active noise control device according to claim 1, wherein the one or more processors cause the active noise control device to: detect a voltage signal that is a time waveform signal of a voltage applied to the actuator; detect a current signal that is a time waveform signal of a current consumed by the actuator; calculate the impedance frequency characteristic based on the voltage signal and the current signal; and identify the peak frequency by performing frequency analysis on the impedance frequency characteristic.

3. The active noise control device according to claim 1, wherein the one or more processors cause the active noise control device to:

calculate an impedance characteristic of the actuator;

output a simulated voltage signal by performing a filtering process that is different from the filtering process performed by the first adaptive filter, by a second adaptive filter, on a current signal that is a time waveform signal of a current consumed by the actuator;

update a filter coefficient of the second adaptive filter so as to minimize a difference between the simulated voltage signal and a voltage signal that is a time waveform signal of a voltage applied to the actuator;

obtain the impedance frequency characteristic by performing a Fourier transform on the filter coefficient of the second adaptive filter; and perform frequency analysis on the impedance frequency characteristic obtained by the Fourier transform unit to identify the peak frequency.

4. The active noise control device according to claim 1, wherein the one or more processors cause the active noise control device to:

determine whether or not the peak frequency is within a predetermined frequency range; and stop generating the control signal when it is determined that the peak frequency is not within the frequency range.

5. The active noise control device according to claim 1, wherein the one or more processors cause the active noise control device to:

determine whether or not the peak frequency is within a predetermined frequency range; and store information indicating that an abnormality has occurred in a characteristic of the actuator when it is determined that the peak frequency is not within the frequency range.

6. The active noise control device according to claim 5, wherein the one or more processors cause an information display device provided at the vehicle to display information indicating that the abnormality has occurred in the characteristic of the actuator when it is determined that the peak frequency is not within the frequency range.

7. The active noise control device according to claim 5, wherein the one or more processors cause the active noise control device to notify a failure diagnosis device of information indicating that the abnormality has occurred in the characteristic of the actuator.

8. The active noise control device according to claim 1, further comprising a table containing a plurality of acoustic characteristics corresponding to the respective peak frequencies, wherein the one or more processors cause the active noise control device to:

correct the reference signal by performing a filtering process by an acoustic characteristic filter on the reference signal in accordance with any of the acoustic characteristics contained in the table;

update a filter coefficient of the first adaptive filter, based on an error signal acquired by detecting residual noise due to interference between the noise and the canceling sound by a microphone and the reference signal corrected by the acoustic characteristic filter; and change the characteristic of the generated control signal, by switching the acoustic characteristics applied to the acoustic characteristic filter according to the peak frequencies.

9. The active noise control device according to claim 1, wherein the actuator is a speaker.

10. A vehicle comprising an active noise control device that causes an actuator to output a canceling sound based on a control signal in order to reduce noise in a vehicle compartment of the vehicle, the active noise control device comprising one or more processors that execute computer-executable instructions stored in a memory, wherein the one or more processors execute the computer-executable instructions to cause the active noise control device to:

generate the control signal by performing a filtering process on a reference signal corresponding to the noise, by a first adaptive filter;

identify a peak frequency in an impedance frequency characteristic that is a frequency characteristic of impedance of the actuator;

store an initial peak frequency that is the peak frequency in the impedance frequency characteristic in an initial state;

determine whether or not a difference between the currently identified peak frequency and the stored initial peak frequency is greater than or equal to a threshold value; and change a characteristic of the generated control signal when it is determined that the difference is greater than or equal to the threshold value.

* * * * *